United States Patent
Lin et al.

(10) Patent No.: US 12,288,981 B2
(45) Date of Patent: Apr. 29, 2025

(54) SURGE PROTECTION CIRCUIT

(71) Applicant: POWERTECH INDUSTRIAL CO., LTD., New Taipei (TW)

(72) Inventors: Chih-Yun Lin, New Taipei (TW); Chih-Hsing Chen, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 225 days.

(21) Appl. No.: 18/161,081

(22) Filed: Jan. 29, 2023

(65) Prior Publication Data
US 2024/0039396 A1 Feb. 1, 2024

(30) Foreign Application Priority Data
Jul. 29, 2022 (TW) .................................. 111208140

(51) Int. Cl.
*H02H 9/04* (2006.01)
*H02H 9/00* (2006.01)
*H02M 7/06* (2006.01)

(52) U.S. Cl.
CPC .............. *H02H 9/04* (2013.01); *H02H 9/005* (2013.01); *H02M 7/062* (2013.01)

(58) Field of Classification Search
CPC ............ H02H 3/32; H02H 9/00; H02H 9/005; H02H 9/04; H02H 9/041; H02H 9/042; H02H 9/043; H02H 9/045; H02J 3/01; H02M 1/123; H02M 1/126; H02M 1/348; H02M 1/36; H02M 7/08; H02M 7/062
See application file for complete search history.

(56) References Cited

U.S. PATENT DOCUMENTS

| | | | | |
|---|---|---|---|---|
| 4,870,528 A * | 9/1989 | Harford | ................. | H02H 9/005 361/111 |
| 5,610,793 A * | 3/1997 | Luu | ........................ | H02H 9/042 361/111 |
| 2003/0086234 A1* | 5/2003 | Harford | ................. | H02H 9/005 361/113 |
| 2006/0007625 A1* | 1/2006 | Harford | ................. | H02H 9/005 361/118 |
| 2013/0301174 A1* | 11/2013 | Walsh | .................... | H02H 9/005 361/58 |
| 2019/0215919 A1* | 7/2019 | Fang | ....................... | H02H 9/048 |

* cited by examiner

*Primary Examiner* — Fred E Finch, III
(74) *Attorney, Agent, or Firm* — Li & Cai Intellectual Property Office

(57) ABSTRACT

A surge protecting circuit is provided. A first stage filter circuit is connected to an alternating current (AC) source. A surge detection driver circuit is connected to a first stage filter circuit. A first snubber circuit is connected to the AC source. A first terminal of a first power switch is connected to the first snubber circuit. A control terminal of the first power switch is connected to the surge detection driver circuit. A first terminal of a second power switch is connected to a second snubber circuit. A second terminal of the second power switch is connected to an output terminal of the surge protecting circuit. A control terminal of the second power switch is connected to the surge detection driver circuit. A multi-stage filter circuit is connected to a second terminal of the first power switch and the second snubber circuit.

21 Claims, 11 Drawing Sheets

SURGE PROTECTION CIRCUIT

CROSS-REFERENCE TO RELATED PATENT APPLICATION

This application claims the benefit of priority to Taiwan Patent Application No. 111208140, filed on Jul. 29, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protecting circuit, and more particularly to a surge protection circuit.

BACKGROUND OF THE DISCLOSURE

With the improvement of quality of life and the popularization of technological products, more and more electric appliances such as televisions, air conditioners, refrigerators, washing machines, microwave ovens, induction cookers, dehumidifiers, electric heaters, among other, are being widely used in households. When the electric appliance is powered on, a current having a surge wave is instantaneously generated by the electric appliance. As a result, the surge waves cause aging or even damage to the electric appliance and electric wires. In particular, electric switches (of sockets) such as relays often suffer serious damaged from the surge wave. Therefore, the reduction of surge waves or prevention thereof has become an increasingly important issue to be addressed.

However, a conventional protection circuit does not provide surge wave detection for a current flowing through the electric appliance and the electric switches (of the socket), which can bring about safety concerns for people indoors. Therefore, the conventional protection circuit must be improved to allow for detection and reduction of the surge waves, thereby preventing the electric appliance and the electric switches from being damaged by the surge wave.

SUMMARY OF THE DISCLOSURE

In response to the above-referenced technical inadequacies, the present disclosure provides a surge protecting circuit. The surge protecting circuit includes a first stage filter circuit, a surge detection driver circuit, a surge suppressor circuit and a multi-stage filter circuit. The first stage filter circuit is connected to an alternating current (AC) source. The first stage filter circuit is configured to filter an AC input signal provided by the AC source to output an initial filtered signal. The surge detection driver circuit is connected to the first stage filter circuit. The surge detection driver circuit is configured to detect the initial filtered signal. The surge detection driver circuit is configured to output a detection driving signal when the surge detection driver circuit determines that the initial filtered signal has a surge wave. The surge suppressor circuit includes a plurality of snubber circuits and a plurality of power switches. The plurality of snubber circuits includes a first snubber circuit and a second snubber circuit. The first snubber circuit is connected to the AC source. The first snubber circuit is configured to attenuate the AC input signal from the AC source to output a first snubber signal. The second snubber circuit is configured to attenuate a first filtered signal to output a second snubber signal. The plurality of power switches includes a first power switch and a second power switch. A first terminal of the first power switch is connected to the first snubber circuit. A control terminal of the first power switch is connected to the surge detection driver circuit. The first power switch operates to output a first surge suppressed signal according to the detection driving signal and the first snubber signal. A first terminal of the second power switch is connected to the second snubber circuit. A second terminal of the second power switch is connected to an output terminal of the surge protecting circuit. A control terminal of the second power switch is connected to the surge detection driver circuit. The second power switch operates to output a second surge suppressed signal as an AC output signal of the surge protecting circuit according to the detection driving signal and the second snubber signal. The multi-stage filter circuit is connected to a second terminal of the first power switch and the second snubber circuit. The multi-stage filter circuit is configured to filter the first surge suppressed signal from the second terminal of the first power switch to output the first filtered signal to the second snubber circuit.

In certain embodiments, the surge detection driver circuit is connected to the AC source. The surge detection driver circuit detects the AC input signal from the AC source. The surge detection driver circuit outputs the detection driving signal to the control terminal of each of the plurality of power switches when the surge detection driver circuit determines that the AC input signal has the surge wave.

In certain embodiments, the multi-stage filter circuit is connected to the second terminal of the second power switch. The multi-stage filter circuit is configured to filter the second surge suppressed signal to output a second filtered signal as the AC output signal of the surge protecting circuit.

In certain embodiments, the plurality of snubber circuits further includes a third snubber circuit. The plurality of power switches further includes a third power switch. The third snubber circuit is connected to the multi-stage filter circuit. A first terminal of the third power switch is connected to the third snubber circuit. A second terminal of the third power switch is connected to the output terminal of the surge protecting circuit. A control terminal of the third power switch is connected to the surge detection driver circuit. The third snubber circuit attenuates the second surge suppression signal to output a third snubber signal. The third power switch operates to output a third surge suppressed signal as the AC output signal of the surge protecting circuit according to the detection driving signal and the third snubber signal.

In certain embodiments, the surge protecting circuit further includes a rectifier circuit. The rectifier circuit includes a first rectifier circuit. The first rectifier circuit is connected between the AC source and the first stage filter circuit.

In certain embodiments, the rectifier circuit further includes a second rectifier circuit. The second rectifier circuit is connected between the multi-stage filter circuit and the surge suppressor circuit.

In certain embodiments, the first stage filter circuit includes a diode and a first filter capacitor. An anode of the diode is connected to the first rectifier circuit. A cathode of the diode is connected to a first terminal of the first filter capacitor. A second terminal of the first filter capacitor is connected to an input terminal of the surge detection driver circuit.

In certain embodiments, the first stage filter circuit includes a plurality of first filter capacitors connected to each other.

In certain embodiments, the multi-stage filter circuit includes a plurality of first filter inductors and at least one filter capacitor. The plurality of first filter inductors are connected in series to each other. A first terminal of one of the plurality of first filter inductors is connected to the AC source. A second terminal of the one of the plurality of first filter inductors is connected to a first terminal of the first filter inductor disposed adjacent thereto. A first terminal of another of the plurality of first filter inductors is connected to a second terminal of the first filter inductor disposed adjacent thereto. A second terminal of the another of the plurality of first filter inductors is connected to a second terminal of each of the plurality of power switches. A first terminal of the at least one filter capacitor is connected to the second terminal of the first filter inductor disposed adjacent thereto. A second terminal of the at least one filter capacitor is connected to an input terminal of one of the plurality of snubber circuits.

In certain embodiments, the multi-stage filter circuit further includes a common mode choke. A first terminal of a first side of the common mode choke is connected to the second terminal of the another of the plurality of first filter inductors. A second terminal of the first side of the common mode choke is connected to an input terminal of the second snubber circuit. A first terminal of a second side of the common mode choke is connected to the second terminal of the at least one filter capacitor. A second terminal of the second side of the common mode choke is connected to the input terminal of the second snubber circuit.

In certain embodiments, the multi-stage filter circuit further includes an output filter capacitor. A first terminal of the output filter capacitor is connected to the second terminal of the first side of the common mode choke. A second terminal of the output filter capacitor is connected to the second terminal of the second side of the common mode choke.

In certain embodiments, the multi-stage filter circuit further includes a first output filter resistor and a second output filter resistor. A first terminal of the first output filter resistor is connected to the second terminal of the first side of the common mode choke. A second terminal of the first output filter resistor is connected to a first terminal of the second output filter resistor. A second terminal of the second output filter resistor is connected to the second terminal of the second side of the common mode choke.

In certain embodiments, the multi-stage filter circuit further includes a plurality of second filter inductors. The plurality of second filter inductors are connected in series to each other. The second terminal of the at least one filter capacitor is connected to a second terminal of the second filter inductor disposed adjacent thereto. A first terminal of one of the plurality of second filter inductors is connected to the AC source. A second terminal of the one of the plurality of second filter inductors is connected to a first terminal of the second filter inductor disposed adjacent thereto. A first terminal of another of the plurality of second filter inductors is connected to the second terminal of the second filter inductor disposed adjacent thereto. A second terminal of the another of the plurality of second filter inductors is connected to the input terminal of the one of the plurality of snubber circuits.

In certain embodiments, the multi-stage filter circuit further includes an input filter capacitor. The input filter capacitor is connected in parallel to the at least one filter capacitor. A first terminal of the input filter capacitor is connected to the AC source and the first terminal of the one of the plurality of first filter inductors. A second terminal of the input filter capacitor is connected to the input terminal of the one of the plurality of snubber circuits.

In certain embodiments, each of the plurality of snubber circuits includes a snubber capacitor, a first snubber inductor and a snubber resistor. A first terminal of the snubber capacitor and a first terminal of the snubber resistor of the first snubber circuit are connected to the AC source. A first terminal of the snubber capacitor and a first terminal of the snubber resistor of another of the plurality of snubber circuits are connected to the multi-stage filter circuit. In each of the plurality of snubber circuits, a first terminal of the first snubber inductor is connected to a second terminal of the snubber capacitor, and a second terminal of the first snubber inductor is connected to the first terminal of the power switch disposed adjacent thereto.

In certain embodiments, each of the plurality of snubber circuits further includes a second snubber inductor. A first terminal of the second snubber inductor of the first snubber circuit is connected to the AC source. A first terminal of the second snubber inductor of another of the plurality of snubber circuits is connected to the multi-stage filter circuit. A second terminal of the second snubber inductor of each of the plurality of snubber circuits is connected to the first terminal of the snubber capacitor.

In certain embodiments, each of the plurality of snubber circuits includes a snubber capacitor, a first snubber inductor and a snubber resistor. A first terminal of the snubber capacitor of the first snubber circuit is connected to the AC source. A first terminal of the snubber capacitor of another of the plurality of snubber circuits is connected to the multi-stage filter circuit. In each of the plurality of snubber circuits, a first terminal of the first snubber inductor is connected to a second terminal of the snubber capacitor, a second terminal of the first snubber inductor is connected to a first terminal of the snubber resistor, and a second terminal of the snubber resistor is connected to the first terminal of the power switch disposed adjacent thereto.

In certain embodiments, each of the plurality of snubber circuits further includes a second snubber inductor. A first terminal of the second snubber inductor of the first snubber circuit is connected to the AC source. A first terminal of the second snubber inductor of another of the plurality of snubber circuits is connected to the multi-stage filter circuit. A second terminal of the second snubber inductor of each of the plurality of snubber circuits is connected to the first terminal of the snubber capacitor.

In certain embodiments, each of the plurality of snubber circuits includes a snubber capacitor, a first snubber inductor and a snubber resistor. The snubber capacitor, the first snubber inductor and the snubber resistor are connected in parallel to each other. A first terminal of the snubber capacitor of the first snubber circuit is connected to the AC source. A first terminal of the snubber capacitor of another of the plurality of snubber circuits is connected to the multi-stage filter circuit. A second terminal of the snubber capacitor of each of the plurality of snubber circuits is connected to the first terminal of the power switch disposed adjacent thereto.

In certain embodiments, each of the plurality of snubber circuits further includes a second snubber inductor. A first terminal of the second snubber inductor of the first snubber circuit is connected to the AC source. A first terminal of the second snubber inductor of another of the plurality of snubber circuits is connected to the multi-stage filter circuit. A second terminal of the second snubber inductor of each of the plurality of snubber circuits is connected to the first terminal of the snubber capacitor.

In certain embodiments, each of the plurality of snubber circuits includes a snubber capacitor, a first snubber inductor and a snubber resistor. A first terminal of the snubber capacitor and a first terminal of the first snubber inductor of the first snubber circuit are connected to the AC source. A first terminal of the snubber capacitor of another of the plurality of snubber circuits and a first terminal of the first snubber inductor are connected to the multi-stage filter circuit. In each of the plurality of snubber circuits, a first terminal of the snubber resistor is connected to a second terminal of the first snubber inductor, and a second terminal of the snubber resistor and a second terminal of the snubber capacitor are connected to the first terminal of the power switch disposed adjacent thereto.

In certain embodiments, each of the plurality of snubber circuits further includes a second snubber inductor. A first terminal of the second snubber inductor of the first snubber circuit is connected to the AC source. A first terminal of the second snubber inductor of another of the plurality of snubber circuits is connected to the multi-stage filter circuit. A second terminal of the second snubber inductor of each of the plurality of snubber circuits is connected to the first terminal of the snubber capacitor.

In certain embodiments, the surge detection driver circuit includes a first resistor, a first capacitor, a second resistor, a second capacitor and a third resistor. A first terminal of the first resistor is connected to the first stage filter circuit. A second terminal of the first resistor is connected to a first terminal of the first capacitor. A second terminal of the first capacitor is connected to a first terminal of the second resistor and a first terminal of the second capacitor. A second terminal of the second capacitor is connected to a first terminal of the third resistor. A first terminal of the third resistor is connected to the control terminal of each of the plurality of power switches. A second terminal of the second capacitor and a second terminal of the third resistor are connected to the second terminal of each of the plurality of power switches.

In certain embodiments, the surge detection driver circuit includes a first diode, a first capacitor, a first resistor and a first Zener diode. An anode of the first diode is connected to the first stage filter circuit. A cathode of the first diode is connected to a first terminal of the first capacitor. A second terminal of the first capacitor is connected to a first terminal of the first resistor and an anode of the first Zener diode. A second terminal of the first resistor is connected to the second terminal of each of the plurality of power switches. A cathode of the first Zener diode is connected to the control terminal of each of the plurality of power switches.

In certain embodiments, the surge detection driver circuit includes a first Zener diode, a first capacitor, a first resistor and a second Zener diode. An anode of the first Zener diode is connected to the first stage filter circuit. A cathode of the first Zener diode is connected to a first terminal of the first resistor, a first terminal of the first capacitor and an anode of the second Zener diode. A cathode of the second Zener diode is connected to the control terminal of each of the plurality of power switches. A second terminal of the first resistor and a second terminal of the first capacitor are connected to the second terminal of each of the plurality of power switches.

In certain embodiments, the surge detection driver circuit includes a triode AC switch (TRIAC), a first resistor and a second resistor. A first terminal of the first resistor is connected to the first stage filter circuit. A second terminal of the first resistor is connected to an anode of the triode AC switch. A cathode of the bi-directional Zener is connected to a first terminal of the second resistor and the control terminal of each of the plurality of power switches. A second terminal of the second resistor is connected to the second terminal of each of the plurality of power switches.

As described above, the present disclosure provides the surge protecting circuit. The surge protecting circuit of the present disclosure automatically detects the AC input signal supplied by the AC source. When the surge protecting circuit of the present disclosure determines that the AC input signal has the surge wave, the surge protecting circuit of the present disclosure instantly attenuates and filters the surge wave from the AC input signal. Therefore, electric appliances and electric wires can be effectively prevented from being damaged by the surge wave, thereby enhancing electrical safety of the electric appliances and electric wire.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
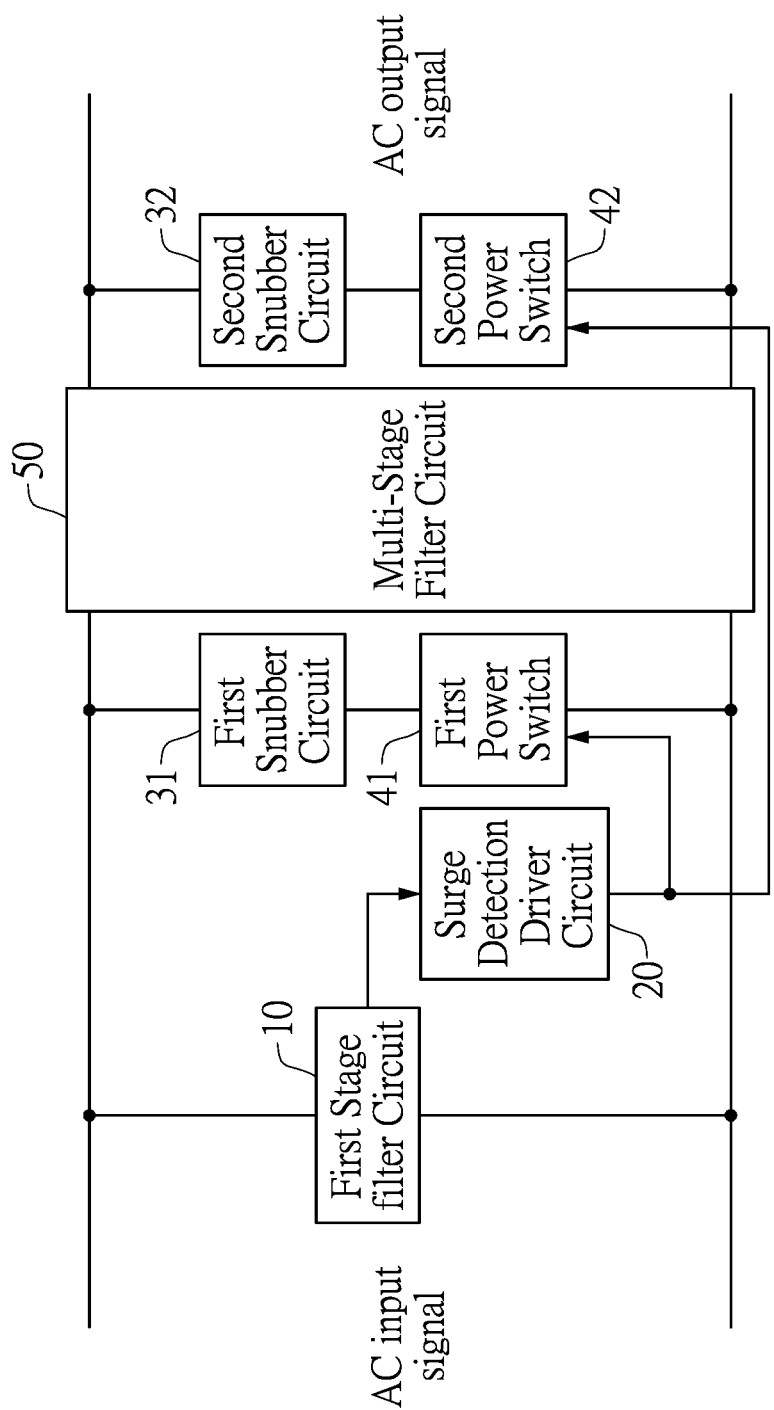
FIG. 1 is a block diagram of a surge protecting circuit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a surge protecting circuit according to a first embodiment of the present disclosure.

It should be understood that, the surge protecting circuit of the embodiment of the present disclosure may include all of circuit components shown in FIG. 1 as described in the following, but the present disclosure is not limited thereto. In practice, some of the circuit components shown in FIG. 1 may be omitted from the surge protecting circuit of the present disclosure.

The surge protecting circuit of the embodiment of the present disclosure may include a first stage filter circuit 10, a surge detection driver circuit 20, a multi-stage filter circuit 50 and a surge suppressor circuit as shown in FIG. 1.

The surge suppressor circuit of the surge protecting circuit of the embodiment of the present disclosure may include a plurality of snubber circuit (such as, but not limited to, a first snubber circuit 31 and a second snubber circuit 32 as shown in FIG. 1), and a plurality of power switches (such as, but not limited to, a first power switch 41 and a second power switch 42 as shown in FIG. 1). In practice, the surge suppressor circuit of the surge protecting circuit of the present disclosure may include more snubber circuits, more power switches, and more filter components in the multi-stage filter circuit 50.

The first stage filter circuit 10 may be connected to an alternating current (AC) source. The first stage filter circuit 10 may filter an AC input signal provided by the AC source to output an initial filtered signal.

The surge detection driver circuit 20 may be connected to the first stage filter circuit 10. The surge detection driver circuit 20 may detect the initial filtered signal from the first stage filter circuit 10. When the surge detection driver circuit 20 determines that a (peak) current or voltage of at least one of waveforms of the initial filtered signal is larger than a threshold, the surge detection driver circuit determines that the initial filtered signal has a surge wave to output a detection driving signal.

An input terminal of the first snubber circuit 31 may be connected to the AC source. An output terminal of the first snubber circuit 31 may be connected to a first terminal of the first power switch 41. The first snubber circuit 31 may attenuate the AC input signal provided by the AC source to output a first snubber signal.

The first terminal of the first power switch 41 may receive the first snubber signal from the first snubber circuit 31. A control terminal of the first power switch 41 may be connected to the surge detection driver circuit 20. The control terminal of the first power switch 41 may receive the detection driving signal from the surge detection driver circuit 20. The first power switch 41 may output a first surge suppressed signal according to the detection driving signal from the surge detection driver circuit 20 and the first snubber signal from the first snubber circuit 31.

The multi-stage filter circuit 50 may be connected to a second terminal of the first power switch 41 and the second snubber circuit 32. The multi-stage filter circuit 50 may filter the first surge suppressed signal from the second terminal of the first power switch 41 to output a first filtered signal to the second snubber circuit 32. Then, the second snubber circuit 32 may attenuate the first filtered signal to output a second snubber signal.

A first terminal of the second power switch 42 may be connected to an output terminal of the second snubber circuit 32. The first terminal of the second power switch 42 may receive the second snubber signal from the second snubber circuit 32. A control terminal of the second power switch 42 may be connected to an output terminal of the surge detection driver circuit 20. The control terminal of the second power switch 42 may receive the detection driving signal from the surge detection driver circuit 20.

A second terminal of the second power switch 42 may be connected to or used as an output terminal of the surge protecting circuit of the embodiment of the present disclosure. The second power switch 42 may operate to output a second surge suppressed signal, according to the detection driving signal from the surge detection driver circuit 20 and the second snubber signal from the second snubber circuit 32. The second surge suppressed signal may be used as an AC output signal of the surge protecting circuit of the first embodiment of the present disclosure.

Figure 2:
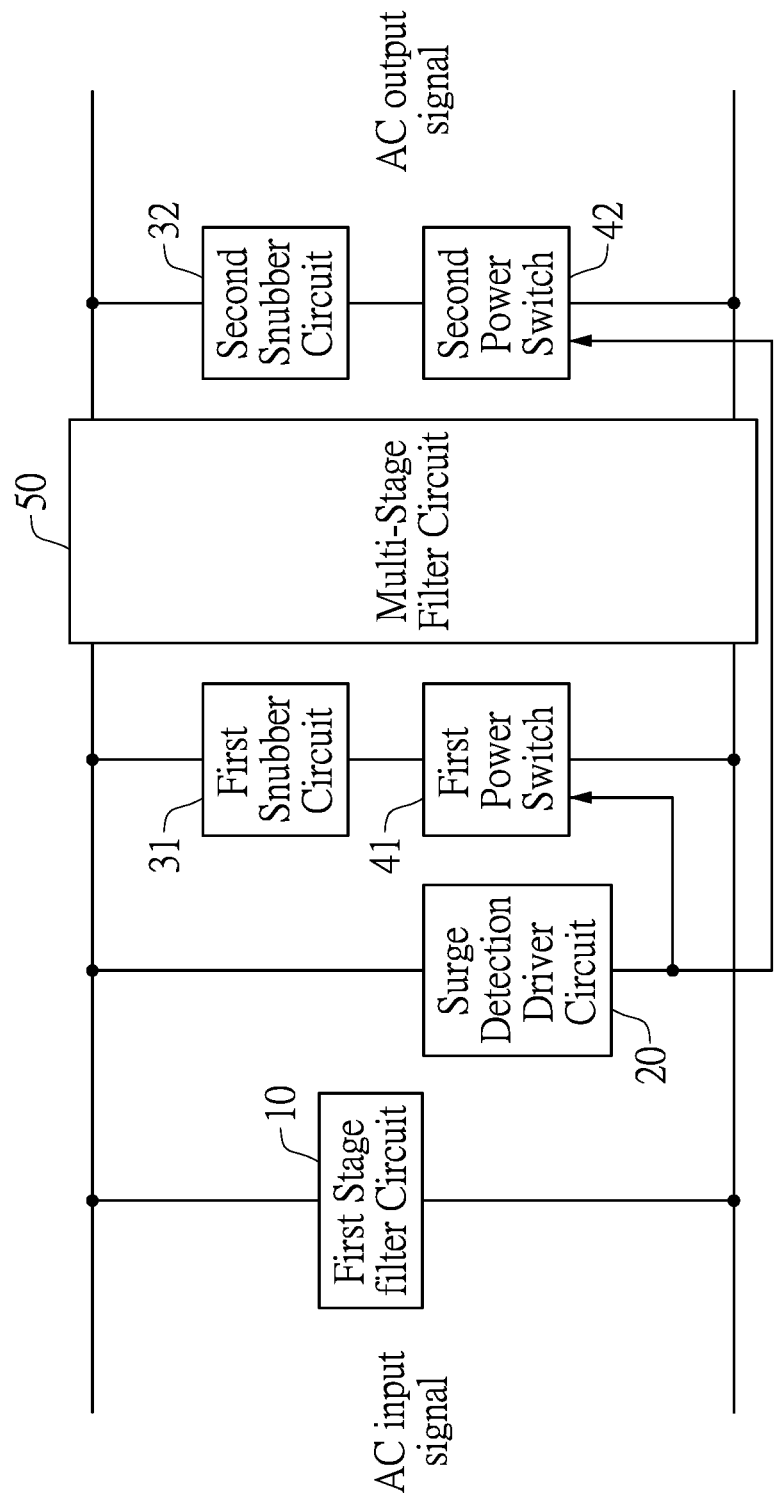
FIG. 2 is a block diagram of a surge protecting circuit according to a second embodiment of the present disclosure.

Reference is made to FIG. 2, which is a block diagram of a surge protecting circuit according to a second embodiment of the present disclosure.

Differences between the second embodiment and the first embodiment are described in the following.

In the first embodiment, as shown in FIG. 1, the surge detection driver circuit 20 may be connected to the first stage filter circuit 10. In the second embodiment, as shown in FIG. 2, the surge detection driver circuit 20 may be directly connected to the AC source.

In the first embodiment, the surge detection driver circuit 20 detects the initial filtered signal from the first stage filter circuit 10, and determines whether or not the initial filtered signal has the surge wave. In the second embodiment, the surge detection driver circuit 20 detects the AC input signal from the AC source, and determines whether or not the AC input signal has the surge wave.

In the second embodiment, when the surge detection driver circuit 20 determines that the AC input signal from the AC source has the surge wave, the surge detection driver circuit 20 outputs the detection driving signal to the control terminal of each of the plurality of power switches (including the first power switch 41 and the second power switch 42 as shown in FIG. 2).

Figure 3:
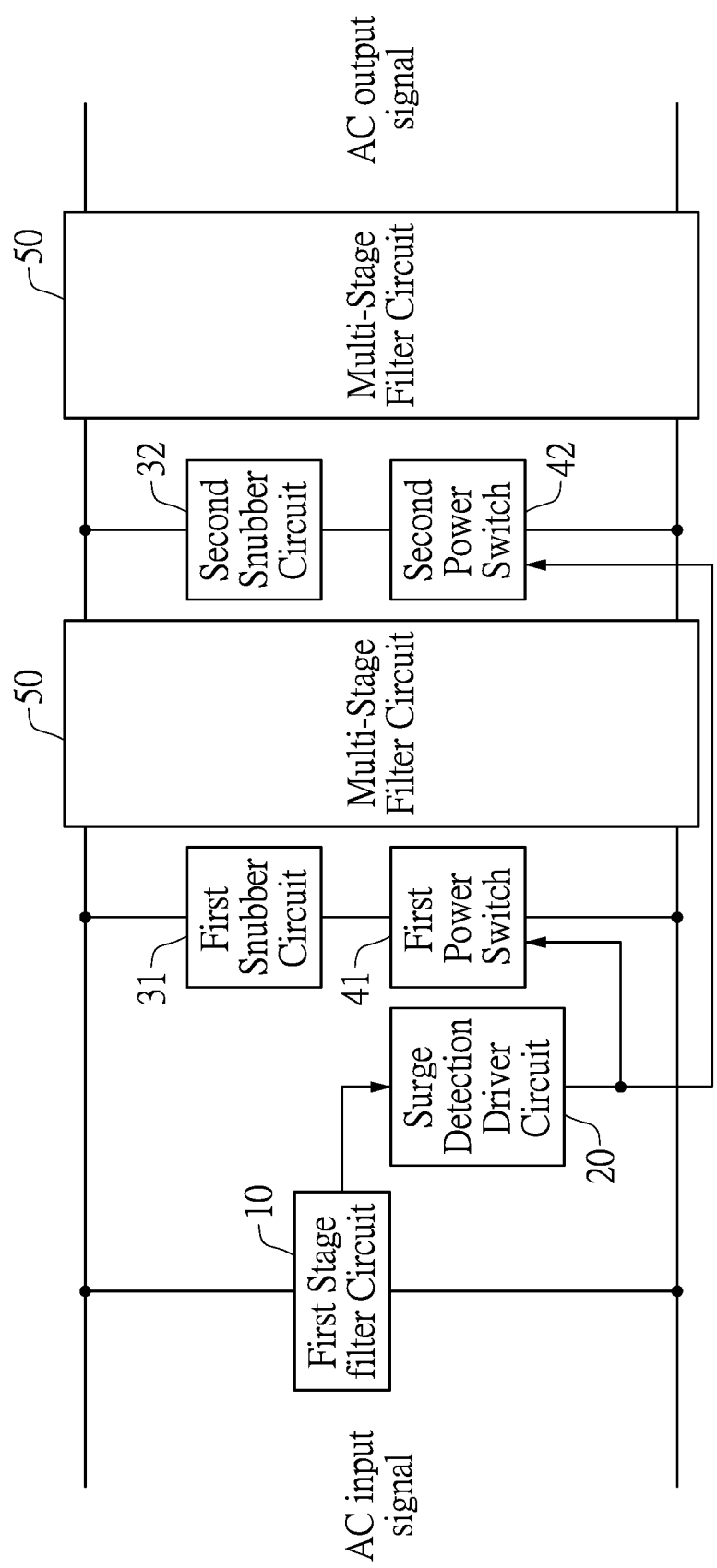
FIG. 3 is a block diagram of a surge protecting circuit according to a third embodiment of the present disclosure.

Reference is made to FIG. 3, which is a block diagram of a surge protecting circuit according to a third embodiment of the present disclosure.

The surge suppressor circuit of the surge protecting circuit of the embodiment of the present disclosure may include a plurality of sub-surge suppressor circuit. Each of the plurality of sub-surge suppressor circuits may include one snubber circuit and one power switch. For example, the plurality of sub-surge suppressor circuits may include a first surge suppressor circuit and a second surge suppressor circuit, but the present disclosure is not limited thereto. The first surge suppressor circuit may include the first snubber circuit 31 and the first power switch 41 as shown in FIG. 3. The second surge suppressor circuit may include the second snubber circuit 32 and the second power switch 42 as shown in FIG. 3.

Each of multiple stages of the multi-stage filter circuit 50 includes a plurality of filter components such as one or more filter capacitors and one or more filter inductors. The filter components of each of the multiple stages of multi-stage filter circuit 50 may filter a surge suppressed signal outputted by each of the plurality of sub-surge suppressor circuits. For example, a first one of the multiple stages of the multi-stage filter circuit 50 filters the first filtered signal outputted by the first power switch 41 of the first surge suppressor circuit.

It is worth noting that, in this embodiment, the second terminal of the second power switch 42 is further connected to the plurality of filter components of a second one of the multiple stages of the multi-stage filter circuit 50. The second power switch 42 may operate to output the second surge suppressed signal to the multi-stage filter circuit 50, according to the detection driving signal from the surge detection driver circuit 20 and the second snubber signal from the second snubber circuit 32.

Then, the filter components of the second one of the multiple stages of the multi-stage filter circuit 50 filters the second surge suppressed signal from the second terminal of the second power switch 42 of the second surge suppressor circuit to output a second filtered signal. The second filtered signal may be used as the AC output signal of the surge protecting circuit of the embodiment of the present disclosure.

Figure 4:
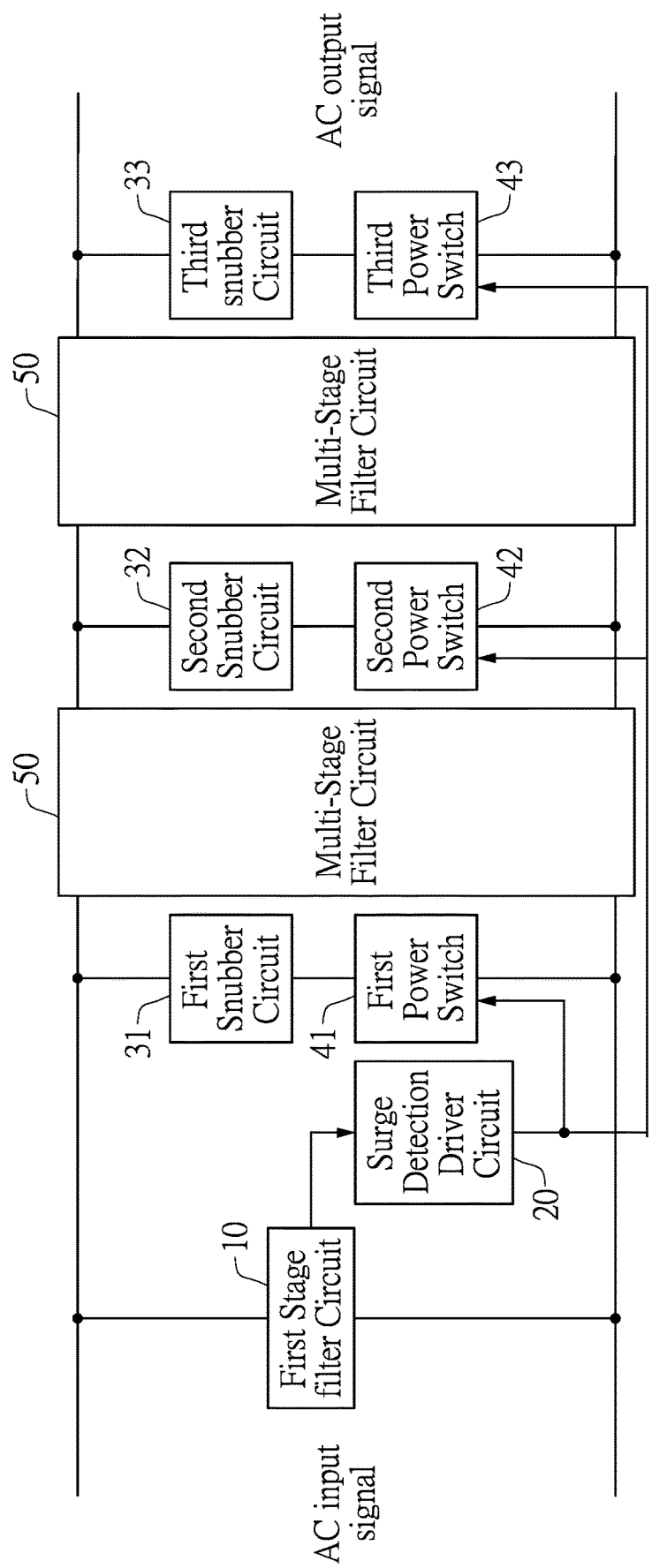
FIG. 4 is a block diagram of a surge protecting circuit according to a fourth embodiment of the present disclosure.

Reference is made to FIG. 4, which is a block diagram of a surge protecting circuit according to a fourth embodiment of the present disclosure.

A difference between the fourth embodiment and the third embodiment is that, in the fourth embodiment, the plurality of snubber circuits of the surge suppressor circuit further includes a third snubber circuit 33, and the plurality of power switches of the surge suppressor circuit further includes a third power switch 43, but the present disclosure is not limited thereto.

An output terminal of the third snubber circuit 33 may be connected to a first terminal of the third power switch 43. A second terminal of the third power switch 43 may be connected to or used as the output terminal of the surge protecting circuit of the embodiment of the present disclosure. A control terminal of the third power switch 43 may be connected to the surge detection driver circuit 20.

The multi-stage filter circuit 50 filters the second surge suppressed signal outputted by the second power switch 42 to output the second filtered signal to the third snubber circuit 33. The third snubber circuit 33 may attenuate the second filtered signal to output a third snubber signal to the first terminal of the third power switch 43.

The third power switch 43 may operate to output the third snubber signal according to the detection driving signal from the surge detection driver circuit 20 and the third snubber signal from the third snubber circuit 33. The third snubber circuit 33 may be used as the AC output signal of the surge protecting circuit of the embodiment of the present disclosure.

Figure 5:
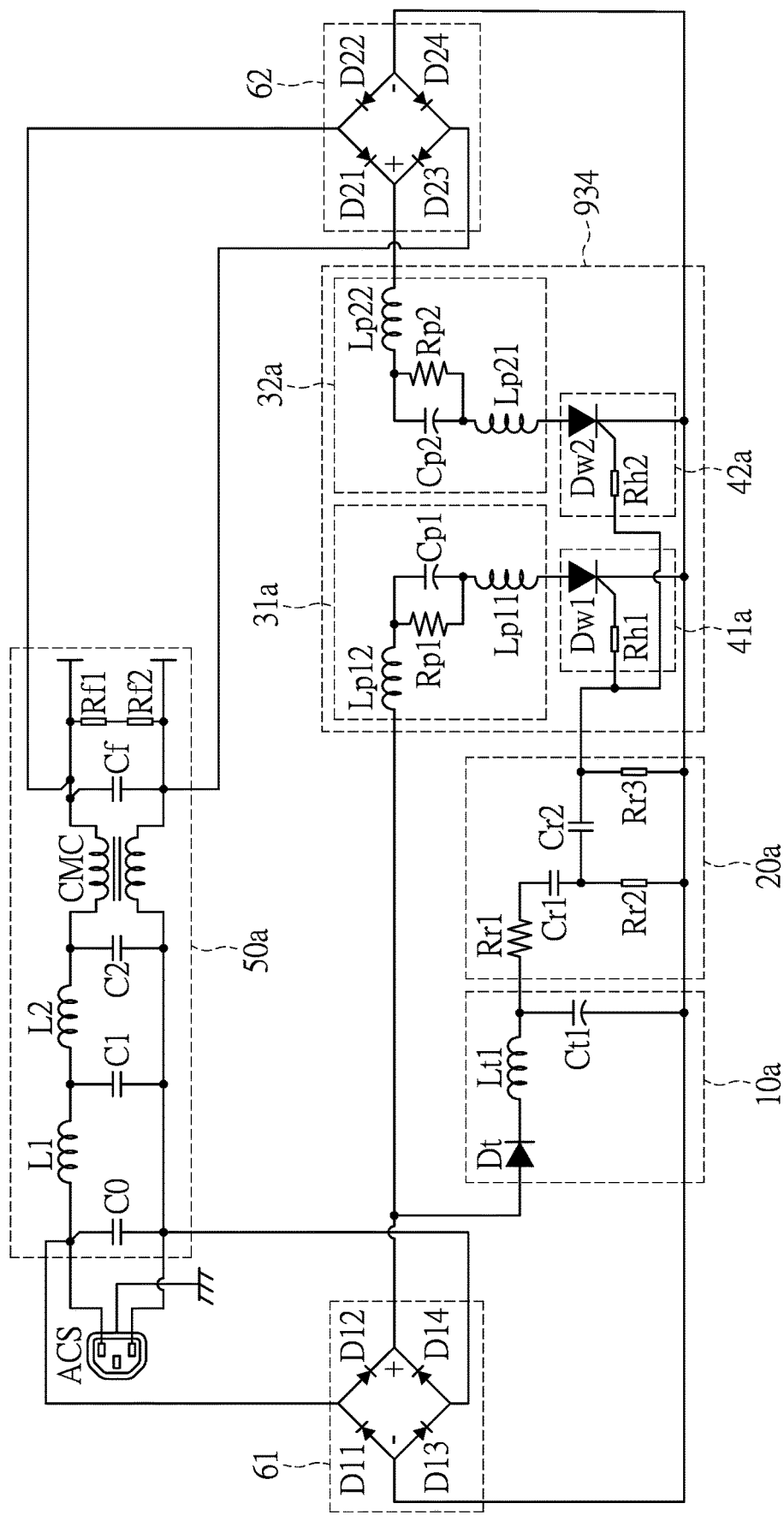
FIG. 5 is a circuit diagram of a surge protecting circuit according to a fifth embodiment of the present disclosure.

Reference is made to FIG. 5, which is a circuit diagram of a surge protecting circuit according to a fifth embodiment of the present disclosure.

The surge protecting circuit of the embodiment of the present disclosure may include a first stage filter circuit 10a, a surge detection driver circuit 20a, a surge suppressor circuit 934, and a multi-stage filter circuit 50a as shown in FIG. 5. The surge suppressor circuit 934 may include a plurality of snubber circuits (such as a first snubber circuit 31a and a second snubber circuit 32a as shown in FIG. 5), and a plurality of power switches (such as a first power switch 41a and a second power switch 42a as shown in FIG. 5). If necessary, the surge protecting circuit of the present disclosure may further include one or both of a first rectifier circuit 61 and a second rectifier circuit 62 as shown in FIG. 5, but the present disclosure is not limited thereto.

The multi-stage filter circuit 50a may include a plurality of filter capacitors (such as, but not limited to, an input filter capacitor C0 and filter capacitors C1, C2 as shown in FIG. 5), and a plurality of filter inductors (such as, but not limited to, first filter inductors L1, L2 as shown in FIG. 5).

In the multi-stage filter circuit 50a, the first filter inductor L1 and the first filter inductor L2 may be connected in series to each other. A first terminal of the first filter inductor L1 may be connected to an alternating current (AC) source ACS. A second terminal of the first filter inductor L1 may be connected to a first terminal of the first filter inductor L2.

A first terminal of the input filter capacitor C0 is connected to the first terminal of the first filter inductor L1 and the AC source ACS. A first terminal of the filter capacitor C1 may be connected to the second terminal of the first filter inductor L1 disposed adjacent thereto. A first terminal of the filter capacitor C2 may be connected to a second terminal of the first filter inductor L2 disposed adjacent thereto. A second terminal of the input filter capacitor C0, a second terminal of the filter capacitor, C1 and a second terminal of each of the filter capacitor C2 may be connected to the AC source ACS and the first rectifier circuit 61.

If necessary, the multi-stage filter circuit 50a may further include one or more of a common mode choke CMC, an output filter capacitor Cf, a first output filter resistor Rf1 and a second output filter resistor Rf2 as shown in FIG. 5, but the present disclosure is not limited thereto.

As shown in FIG. 5, the second terminal of the first filter inductor L2 may be connected to a first terminal of a first side of the common mode choke CMC. The second terminal of the input filter capacitor C0 and the second terminal of each of the filter capacitors C1, C2 may be connected to a first terminal of a second side of the common mode choke CMC.

A second terminal of the first side of the common mode choke CMC may be connected to a first terminal of the output filter capacitor Cf and a first terminal of the first output filter resistor Rf1. A second terminal of the first output filter resistor Rf1 may be connected to a first terminal of the second output filter resistor Rf2. A second terminal of the second side of the common mode choke CMC may be connected to a second terminal of the output filter capacitor Cf and a second terminal of the second output filter resistor Rf2.

The first rectifier circuit 61 may be connected between the AC source ACS and the first stage filter circuit 10a. The first rectifier circuit 61 may include a plurality of rectifier components such as a first rectifier diode D11, a second rectifier diode D12, a third rectifier diode D13 and a fourth rectifier diode D14 as shown in FIG. 5.

An anode of the second rectifier diode D12 may be connected to a cathode of the first rectifier diode D11 and the AC source ACS. A cathode of the second rectifier diode D12 may be connected to a cathode of the fourth rectifier diode D14 and the first stage filter circuit 10a. An anode of the fourth rectifier diode D14 may be connected to a cathode of the third rectifier diode D13 and the AC source ACS. An anode of the third rectifier diode D13 may be connected to an anode of the first rectifier diode D11.

The first rectifier circuit 61 may rectify the AC input signal provided by the AC source ACS and then provide the rectified AC input signal to the first stage filter circuit 10a.

The first stage filter circuit 10a may include a diode Dt and a first filter capacitor Ct1. If necessary, the first stage filter circuit 10a may further include a first filter inductor Lt1.

An anode of the diode Dt may be connected to the cathode of the second rectifier diode D12 and the cathode of the fourth rectifier diode D14 of the first rectifier circuit 61. A cathode of the diode Dt may be connected to a first terminal of the first filter inductor Lt1. A second terminal of first filter inductor Lt1 may be connected to a first terminal of the first filter capacitor Ct1. A second terminal of the first filter capacitor Ct1 may be connected to the anode of the third rectifier diode D13.

The surge detection driver circuit 20a may include one or more of a first resistor Rr1, a first capacitor Cr1, a second resistor Rr2, a second capacitor Cr2 and a third resistor Rr3.

A first terminal of the first resistor Rr1 is connected to the first terminal of the first filter capacitor Ct1 of the first stage filter circuit 10a. A second terminal of the first resistor Rr1 is connected to a first terminal of the first capacitor Cr1. A second terminal of the first capacitor Cr1 may be connected to a first terminal of the second resistor Rr2 and a first terminal of the second capacitor Cr2. A second terminal of the second capacitor Cr2 may be connected to a first terminal of the third resistor Rr3. A second terminal of the second resistor Rr2 and a second terminal of the third resistor Rr3 may be connected to the anode of the third rectifier diode D13 of the first rectifier circuit 61.

The surge suppressor circuit 934 may include two or more power switches such as the first power switch 41a and the second power switch 42a as shown in FIG. 5, but the present disclosure is not limited thereto. The first power switch 41a may include a diode Dw1. The second power switch 42a may include a diode Dw2. If necessary, each of the power switches may further include one or more resistors. For example, as shown in FIG. 5, the first power switch 41a may further include a resistor Rh1, and the second power switch 42a may further include a resistor Rh2.

The second terminal of the second capacitor Cr2 of the surge detection driver circuit 20a and the first terminal of the third resistor Rr3 may be connected to a first terminal of the resistor Rh1 of the first power switch 41a and a first terminal of the resistor Rh2 of the second power switch 42a. A second terminal of the resistor Rh1 of the first power switch 41a may be connected to a control terminal of the diode Dw1 of the first power switch 41a. A second terminal of the resistor Rh2 of the second power switch 42a may be connected to a control terminal of the diode Dw2 of the second power switch 42a.

In the surge suppressor circuit 934, the first snubber circuit 31a may include a snubber capacitor Cp1, a first snubber inductor Lp11 and a snubber resistor Rp1. In addition, in the surge suppressor circuit 934, the second snubber circuit 32a may include a snubber capacitor Cp2, a first snubber inductor Lp21 and a snubber resistor Rp2. If necessary, the first snubber circuit 31a may further include a second snubber inductor Lp12, and the second snubber circuit 32a may further include a second snubber inductor Lp22.

A first terminal of the second snubber inductor Lp12 of the first snubber circuit 31a may be connected to the cathode of the second rectifier diode D12 of the first rectifier circuit 61 and the cathode of the fourth rectifier diode D14 of the first rectifier circuit 61. A second terminal of the second snubber inductor Lp12 may be connected to a first terminal of the snubber capacitor Cp1 and a first terminal of the snubber resistor Rp1. A second terminal of the snubber capacitor Cp1 and a second terminal of the snubber resistor Rp1 may be connected to a first terminal of the first snubber inductor Lp11. A second terminal of the first snubber inductor Lp11 may be connected to an anode of the diode Dw1 of the first power switch 41a.

In the second snubber circuit 32a, a first terminal of the snubber capacitor Cp2 and a first terminal of the snubber resistor Rp2 may be connected to a second terminal of the second snubber inductor Lp22. A second terminal of the snubber capacitor Cp2 and a second terminal of the snubber resistor Rp2 may be connected to a first terminal of the first snubber inductor Lp21. A second terminal of the first snubber inductor Lp21 may be connected to an anode of the diode Dw2 of the second power switch 42a. A cathode of the diode Dw1 of the first power switch 41a, a cathode of the diode Dw2 of the second power switch 42a and a first terminal of the second snubber inductor Lp22 may be connected to the second rectifier circuit 62.

The second rectifier circuit 62 may include a plurality of rectifier components such as a first rectifier diode D21, a second rectifier diode D22, a third rectifier diode D23 and a fourth rectifier diode D24.

The first terminal of the second snubber inductor Lp22 may be connected to a cathode of the first rectifier diode D21. An anode of the third rectifier diode D23 may be connected to a cathode of the fourth rectifier diode D24. An anode of the fourth rectifier diode D24 may be connected to an anode of the second rectifier diode D22, the cathode of the diode Dw1 of the first power switch 41a and the cathode of the diode Dw2 of the second power switch 42a.

A cathode of the second rectifier diode D22 may be connected to an anode of the first rectifier diode D21 and the first terminal of the output filter capacitor Cf of the multi-stage filter circuit 50a. The second terminal of the output filter capacitor Cf of the multi-stage filter circuit 50a may be connected to the anode of the third rectifier diode D23. A cathode of the third rectifier diode D23 may be connected to the first terminal of the second snubber inductor Lp22.

Figure 6:
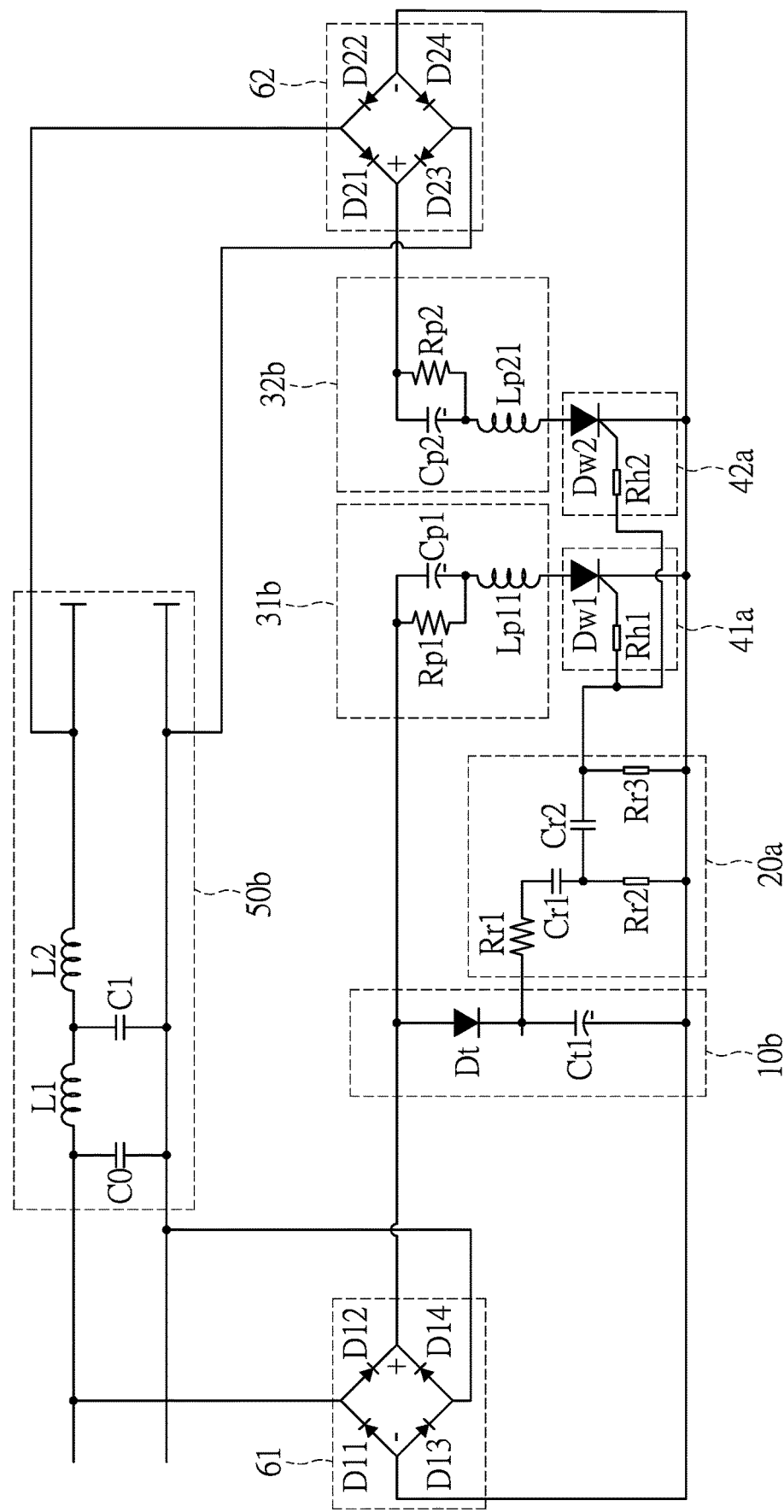
FIG. 6 is a circuit diagram of a surge protecting circuit according to a sixth embodiment of the present disclosure.

Reference is made to FIG. 6, which is a circuit diagram of a surge protecting circuit according to a sixth embodiment of the present disclosure.

Differences between the sixth embodiment of FIG. 6 and the fifth embodiment of FIG. 5 are described in the following.

In the sixth embodiment, a multi-stage filter circuit 50b of the surge protecting circuit as shown in FIG. 6 does not include the common mode choke CMC, the output filter capacitor Cf, the first output filter resistor Rf1 and the second output filter resistor Rf2 as shown in FIG. 5.

In the sixth embodiment, a first stage filter circuit 10b of the surge protecting circuit as shown in FIG. 6 does not include the first filter inductor Lt1 as shown in FIG. 5.

In the sixth embodiment, a first snubber circuit 31b of the surge protecting circuit as shown in FIG. 6 does not include the second snubber inductor Lp12 as shown in FIG. 5.

In the sixth embodiment, a second snubber circuit 32b of the surge protecting circuit as shown in FIG. 6 does not include the second snubber inductor Lp22 as shown in FIG. 5.

Other descriptions of the sixth embodiment are the same as that of the fifth embodiment and thus are not repeated herein.

Figure 7A:
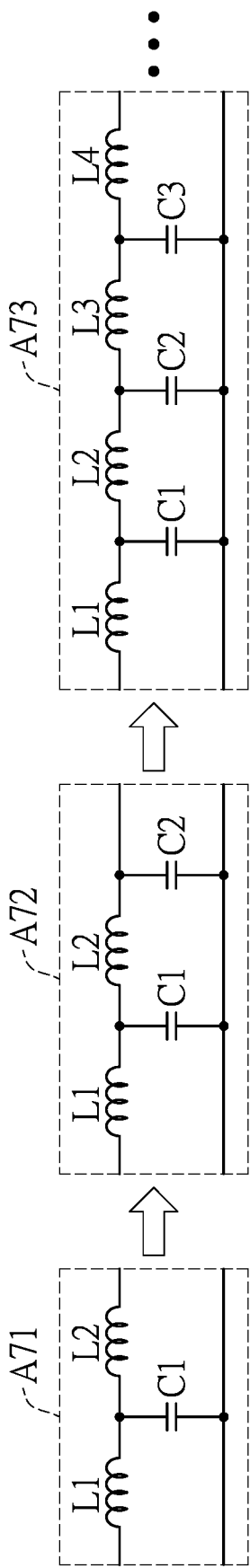
FIG. 7A is a circuit diagram of a multi-stage filter circuit of a surge protecting circuit according to a seventh embodiment of the present disclosure.

Reference is made to FIG. 7A, which is a circuit diagram of a multi-stage filter circuit of a surge protecting circuit according to a seventh embodiment of the present disclosure.

The surge protecting circuit of seventh embodiment of the present disclosure may include a multi-stage filter circuit A71, A72 or A73 as shown in FIG. 7A.

As shown in FIG. 7A, the multi-stage filter circuit A71 includes the first filter inductors L1, L2, and the filter capacitor C1. A first terminal of the first filter inductor L1 may be connected to the AC source. The second terminal of the first filter inductor L1 is connected to a first terminal of the first filter inductor L2. The second terminal of the first filter inductor L2 may be connected to a rectifier circuit. For example, the second terminal of the first filter inductor L2 may be connected to the cathode of the second rectifier diode D22 of the second rectifier circuit 62 as shown in FIG. 5 or FIG. 6. The first terminal of the filter capacitor C1 is connected to the second terminal of the first filter inductor L1. A second terminal of the filter capacitor C1 may be connected to a rectifier circuit. For example, the second terminal of the filter capacitor C1 may be connected to the anode of the third rectifier diode D23 of the second rectifier circuit 62 as shown in FIG. 5 or FIG. 6.

As shown in FIG. 7A, the multi-stage filter circuit A72 further includes the filter capacitor C2. The first terminal of the filter capacitor C2 is connected to the second terminal of the first filter inductor L2 disposed adjacent thereto. A second terminal of the filter capacitor C2 may be connected to a rectifier circuit. For example, the second terminal of the filter capacitor C2 may be connected to the anode of the third rectifier diode D23 of the second rectifier circuit 62 as shown in FIG. 5 or FIG. 6.

As shown in FIG. 7A, the multi-stage filter circuit A73 further includes a filter capacitor C3 and first filter inductors L3 and L4. A first terminal of the first filter inductor L3 is connected to the second terminal of the first filter inductor L2. A first terminal of the first filter inductor L4 is connected to a second terminal of the first filter inductor L3. A second terminal of the first filter inductor L4 may be connected to a rectifier circuit. For example, the second terminal of the first filter inductor L4 may be connected to the cathode of the second rectifier diode D22 of the second rectifier circuit 62 as shown in FIG. 5 or FIG. 6. A first terminal of the filter capacitor C3 is connected to the second terminal of the first filter inductor L3 disposed adjacent thereto. A second terminal of the filter capacitor C3 may be connected to a rectifier circuit. For example, the second terminal of the filter capacitor C3 may be connected to the anode of the third rectifier diode D23 of the second rectifier circuit 62 as shown in FIG. 5 or FIG. 6.

Figure 7B:
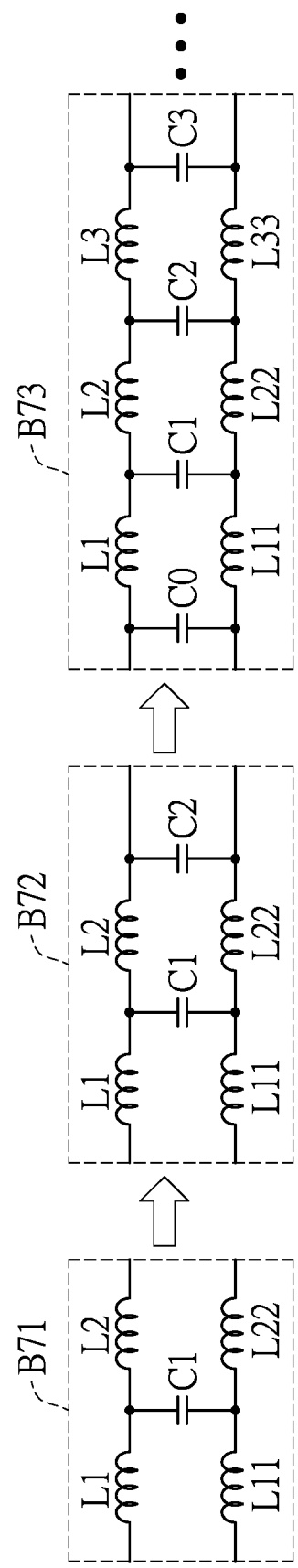
FIG. 7B is a circuit diagram of a multi-stage filter circuit of a surge protecting circuit according to an eighth embodiment of the present disclosure.

Reference is made to FIG. 7B, which is a circuit diagram of a multi-stage filter circuit of a surge protecting circuit according to an eighth embodiment of the present disclosure.

The surge protecting circuit of the present disclosure may include a multi-stage filter circuit B71, B72 or B73 as shown in FIG. 7B.

As shown in FIG. 7B, the multi-stage filter circuit B71 not only includes the first filter inductors L1, L2 and the filter capacitor C1, but also includes second filter inductor L11, L22. A first terminal of the second filter inductor L11 may be connected to a first rectifier circuit. For example, the first terminal of the second filter inductor L11 may be connected to the anode of the fourth rectifier diode D14 of the first rectifier circuit 61 as shown in FIG. 5 or FIG. 6. A second terminal of the second filter inductor L11 is connected to a first terminal of the second filter inductor L22 and the second terminal of the filter capacitor C1. A second terminal of the second filter inductor L22 may be connected to a rectifier circuit. For example, the second terminal of the second filter inductor L22 may be connected to the anode of the third rectifier diode D23 of the second rectifier circuit 62 as shown in FIG. 5 or FIG. 6.

As shown in FIG. 7B, the multi-stage filter circuit B72 may further include the filter capacitor C2. The first terminal of the filter capacitor C2 is connected to the second terminal of the first filter inductor L2. The second terminal of the filter capacitor C2 is connected to the second terminal of the second filter inductor L22.

As shown in FIG. 7C, the multi-stage filter circuit B73 may further include the input filter capacitor C0, the filter capacitor C3, the first filter inductor L3 and a second filter inductor L33. The first terminal of the input filter capacitor C0 is connected to the first terminal of the first filter inductor L1 and the AC source. The second terminal of the input filter capacitor C0 may be connected to a rectifier circuit. For example, the second terminal of the input filter capacitor C0 may be connected to the anode of the fourth rectifier diode D14 of the first rectifier circuit 61 as shown in FIG. 5 or FIG. 6. The first terminal of the first filter inductor L3 is connected to the second terminal of the first filter inductor L2 and the first terminal of the filter capacitor C2. A first terminal of the second filter inductor L33 is connected to the second terminal of the second filter inductor L22 and the second terminal of the filter capacitor C2. The first terminal of the filter capacitor C3 is connected to the second terminal of the first filter inductor L3. The second terminal of the filter capacitor C3 is connected to a second terminal of the second filter inductor L33.

The surge protecting circuit the embodiment of the present disclosure may include the multi-stage filter circuit A71, A72, A73, B71, B72 or B73 as described above, but the present disclosure is not limited thereto. In practice, the surge protecting circuit of the present disclosure may include a multi-stage filter circuit including more filter inductors and more filter capacitors.

Figure 8A:
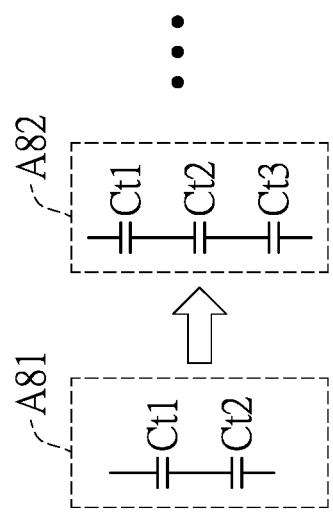
FIG. 8A is a circuit diagram of a first stage filter circuit of a surge protecting circuit according to a ninth embodiment of the present disclosure.
Figure 8B:
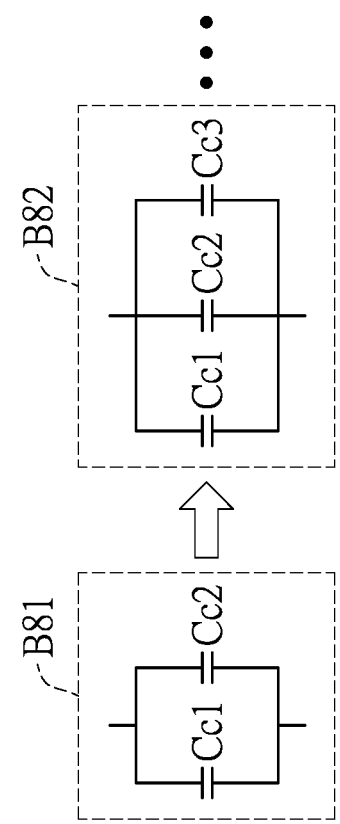
FIG. 8B is a circuit diagram of a first stage filter circuit of a surge protecting circuit according to a tenth embodiment of the present disclosure.

On the other hand, the first stage filter circuit 10a as shown in FIG. 5 or the first stage filter circuit 10b as shown in FIG. 6 may be replaced with a first stage filter circuit A81 or A82 as shown in FIG. 8A or a first stage filter circuit B81 or B82 as shown in FIG. 8B, as described in the following.

Reference is made to FIG. 8A, which is a circuit diagram of a first stage filter circuit of a surge protecting circuit according to a ninth embodiment of the present disclosure.

As shown in FIG. 8A, the stage filter circuit of the surge protecting circuit may include the first filter capacitor Ct1 and a first filter capacitor Ct2. The first filter capacitor Ct1 and the first filter capacitor Ct2 are connected in series to each other. The first terminal of the first filter capacitor Ct1 may be connected to a rectifier circuit. For example, the first terminal of the first filter capacitor Ct1 may be connected to the cathode of the second rectifier diode D12 of the first rectifier circuit 61 as shown in FIG. 5 or FIG. 6. The second terminal of the first filter capacitor Ct1 is connected to a first terminal of the first filter capacitor Ct2. A second terminal of the first filter capacitor Ct2 may be connected to a rectifier circuit. For example, the second terminal of the first filter capacitor Ct2 may be connected to the anode of the third rectifier diode D13 of the first rectifier circuit 61 as shown in FIG. 5 or FIG. 6.

As shown in FIG. 8A, the stage filter circuit of the surge protecting circuit may further include a first filter capacitor Ct3. The first filter capacitor Ct3 is connected in series to the first filter capacitors Ct1 and Ct2. A first terminal of the first filter capacitor Ct3 is connected to the second terminal of the first filter capacitor Ct2. A second terminal of the first filter capacitor Ct3 may be connected to the rectifier circuit. For example, the second terminal of the first filter capacitor Ct3 may be connected to the anode of the third rectifier diode D13 of the first rectifier circuit 61 as shown in FIG. 5 or FIG. 6.

If necessary, the multi-stage filter circuit of the surge protecting circuit of the present disclosure may include more filter capacitors connected in series to the first filter capacitors Ct1, Ct2, Ct3. In practice, all or some of the filter capacitors included in the multi-stage filter circuit of surge protecting circuit of the present disclosure may be connected in parallel to each other, as described in the following.

Reference is made to FIG. 8B, which is a circuit diagram of a first stage filter circuit of a surge protecting circuit according to a tenth embodiment of the present disclosure.

As shown in FIG. 8B, the first stage filter circuit B81 may include a plurality of filter capacitors Cc1, Cc2. The filter capacitor Cc1 is connected in parallel to the filter capacitor Cc2. A first terminal of the filter capacitor Cc1 and a first terminal of the filter capacitor Cc2 may be connected to a rectifier circuit. For example, the first terminal of the filter capacitor Cc1 and the first terminal of the filter capacitor Cc2 may be connected to the cathode of the second rectifier diode D12 of the first rectifier circuit 61 as shown in FIG. 5 or FIG. 6. A second terminal of the filter capacitor Cc1 and a second terminal of the filter capacitor Cc2 may be connected to a rectifier circuit. For example, the second terminal of the filter capacitor Cc1 and the second terminal of the filter capacitor Cc2 may be connected to the anode of the third rectifier diode D13 of the first rectifier circuit 61 as shown in FIG. 5 or FIG. 6.

As shown in FIG. 8B, the first stage filter circuit B82 may further include a filter capacitor Cc3. The filter capacitor Cc3 is connected in parallel to the filter capacitor Cc1 and the filter capacitor Cc2. If necessary, the first stage filter circuit of the present disclosure may include more filter capacitors that are connected in parallel to each other.

Figure 9C:
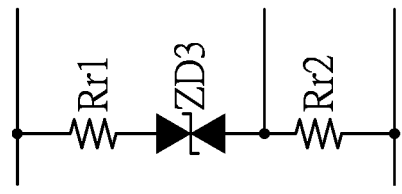
FIG. 9C is a circuit diagram of a surge detection driver circuit of a surge protecting circuit according to a thirteenth embodiment of the present disclosure.
Figure 9B:
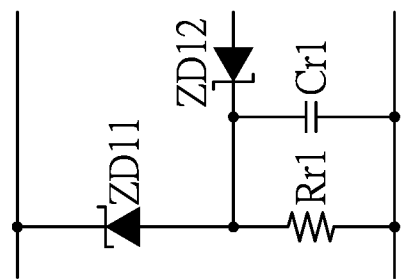
FIG. 9B is a circuit diagram of a surge detection driver circuit of a surge protecting circuit according to a twelfth embodiment of the present disclosure.
Figure 9A:
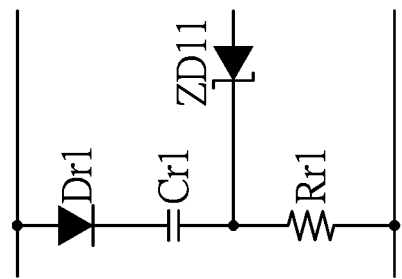
FIG. 9A is a circuit diagram of a surge detection driver circuit of a surge protecting circuit according to an eleventh embodiment of the present disclosure.

On the other hand, the surge detection driver circuit 20a shown in FIG. 5 or FIG. 6 may be replaced with a surge detection driver circuit shown in FIG. 9A, 9B or 9C.

Reference is made to FIG. 9A, which is a circuit diagram of the surge detection driver circuit of a surge protecting circuit according to an eleventh embodiment of the present disclosure.

The surge detection driver circuit of the embodiment of the present disclosure may include a first diode Dr1, the first capacitor Cr1, the first resistor Rr1 and a first Zener diode ZD11 as shown in FIG. 9A.

An anode of the first diode Dr1 is connected to a first stage filter circuit. For example, the anode of the first diode Dr1 is connected to the first terminal of the first filter capacitor Ct1 of the first stage filter circuit 10a as shown in FIG. 5 or the first terminal of the first filter capacitor Ct1 of the first stage filter circuit 10b as shown in FIG. 6.

A cathode of the first diode Dr1 may be connected to the first terminal of the first capacitor Cr1. The second terminal of the first capacitor Cr1 may be connected to a first terminal of the first resistor Rr1 and a cathode of the first Zener diode ZD11. The second terminal of the first resistor Rr1 may be connected to a rectifier circuit. For example, the second terminal of the first resistor Rr1 may be connected to the anode of the third rectifier diode D13 of the first rectifier circuit 61 as shown in FIG. 5 or FIG. 6.

An anode of the first Zener diode ZD11 may be connected to the control terminal of each of the plurality of power switches. For example, the anode of the first Zener diode ZD11 may be connected to the first terminal of the resistor Rh1 of the first power switch 41a and the first terminal of the resistor Rh2 of the second power switch 42a as shown in FIG. 5 or FIG. 6.

Reference is made to FIG. 9B, which is a circuit diagram of the surge detection driver circuit of a surge protecting circuit according to a twelfth embodiment of the present disclosure.

The surge detection driver circuit of the twelfth embodiment of the present disclosure may include the first Zener diode ZD11, the first capacitor Cr1, the first resistor Rr1 and a second Zener diode ZD12 as shown in FIG. 9B.

The cathode of the first Zener diode ZD11 may be connected to a first stage filter circuit. For example, the cathode of the first Zener diode ZD11 may be connected to the first terminal of the first filter capacitor Ct1 of the first stage filter circuit 10a as shown in FIG. 5 or the first terminal of the first filter capacitor Ct1 of the first stage filter circuit 10b as shown in FIG. 6. The anode of the first Zener diode ZD11 may be connected to the first terminal of the first resistor Rr1, the first terminal of the first capacitor Cr1 and a cathode of the second Zener diode ZD12.

An anode of the second Zener diode ZD12 may be connected to the control terminal of each of the plurality of power switches. For example, the anode of the second Zener diode ZD12 may be connected to the first terminal of the resistor Rh1 of the first power switch 41a and the first terminal of the resistor Rh2 of the second power switch 42*a* as shown in FIG. 5 or FIG. 6.

The second terminal of the first resistor Rr1 and the second terminal of the first capacitor Cr1 may be connected to a rectifier circuit. For example, the second terminal of the first resistor Rr1 and the second terminal of the first capacitor Cr1 may be connected to the anode of the third rectifier diode D13 of the first rectifier circuit 61 as shown in FIG. 5 or FIG. 6.

Reference is made to FIG. 9C, which is a circuit diagram of the surge detection driver circuit of a surge protecting circuit according to a thirteenth embodiment of the present disclosure.

The surge detection driver circuit of the thirteenth embodiment of the present disclosure may include a triode AC switch (TRIAC) ZD3, the first resistor Rr1 and the second resistor Rr2.

The first terminal of the first resistor Rr1 may be connected to a first stage filter circuit. For example, the first terminal of the first resistor Rr1 may be connected to the first terminal of the first filter capacitor Ct1 of the first stage filter circuit 10*a* as shown in FIG. 5 or the first terminal of the first filter capacitor Ct1 of the first stage filter circuit 10*b* as shown in FIG. 6.

The second terminal of the first resistor Rr1 may be connected to a first terminal of the triode AC switch ZD3. A second terminal of the triode AC switch ZD3 may be connected to the first terminal of the second resistor Rr2. In addition, the second terminal of the triode AC switch ZD3 may be connected to the control terminal of each of the plurality of power switches. For example, the second terminal of the triode AC switch ZD3 may be connected to the first terminal of the resistor Rh1 of the first power switch 41*a* and the first terminal of the resistor Rh2 of the second power switch 42*a* as shown in FIG. 5 or FIG. 6.

The second terminal of the second resistor Rr2 may be connected to a rectifier circuit. For example, the second terminal of the second resistor Rr2 may be connected to the anode of the third rectifier diode D13 of the first rectifier circuit 61 as shown in FIG. 5 or FIG. 6.

In practice, the surge detection driver circuit of the surge protecting circuit of the present disclosure may include a microcontroller, a comparator or other circuit components.

Figure 10C:
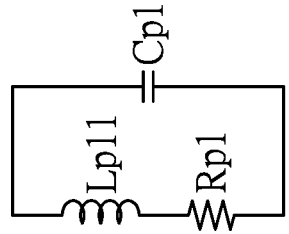
FIG. 10C is a circuit diagram of a snubber circuit of a surge protecting circuit according to a sixteenth embodiment of the present disclosure.
Figure 10B:
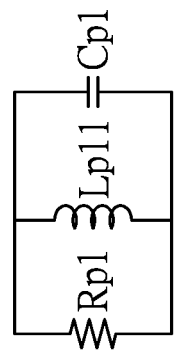
FIG. 10B is a circuit diagram of a snubber circuit of a surge protecting circuit according to a fifteenth embodiment of the present disclosure.
Figure 10A:
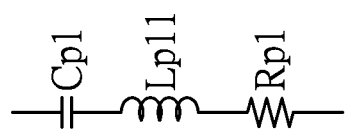
FIG. 10A is a circuit diagram of a snubber circuit of a surge protecting circuit according to a fourteenth embodiment of the present disclosure.

On the other hand, the first snubber circuit 31*b* shown in FIG. 6 may be replaced with a snubber circuit as shown in FIG. 10A, FIG. 10B or FIG. 10C. In addition or alternatively, the second snubber circuit 32*b* shown in FIG. 6 or other snubber circuits may be replaced with the snubber circuit shown in FIG. 10A, FIG. 10B or FIG. 10C.

Reference is made to FIG. 10A, which is a circuit diagram of the snubber circuit of a surge protecting circuit according to a fourteenth embodiment of the present disclosure.

The snubber circuit of the fourteenth embodiment of the present disclosure may include the snubber capacitor Cp1, the first snubber inductor Lp11 and the snubber resistor Rp1 as shown in FIG. 10A.

The first terminal of the snubber capacitor Cp1 as shown in FIG. 10A may be connected to a rectifier circuit. For example, the first terminal of the snubber capacitor Cp1 as shown in FIG. 10A may be connected to the cathode of the second rectifier diode D12 of the first rectifier circuit 61 and the cathode of the fourth rectifier diode D14 of the first rectifier circuit 61 as shown in FIG. 6.

As shown in FIG. 10A, the second terminal of the snubber capacitor Cp1 is connected to the first terminal of the first snubber inductor Lp11. The second terminal of the first snubber inductor Lp11 is connected to the first terminal of the snubber resistor Rp1. The second terminal of the snubber resistor Rp11 is connected to the first terminal of the power switch disposed adjacent thereto. For example, the second terminal of the snubber resistor Rp11 is connected to the anode of the diode Dw1 of the first power switch 41*a* or the anode of the diode Dw2 of the second power switch 42*a* as shown in FIG. 6.

Reference is made to FIG. 10B, which is a circuit diagram of the snubber circuit of a surge protecting circuit according to a fifteenth embodiment of the present disclosure.

As shown in FIG. 10B, the first terminal of the first snubber inductor Lp11, the first terminal of the snubber capacitor Cp1 and the first terminal of the snubber resistor Rp1 may be connected to a rectifier circuit. For example, the first terminal of the first snubber inductor Lp11, the first terminal of the snubber capacitor Cp1 and the first terminal of the snubber resistor Rp1 may be connected to the cathode of the second rectifier diode D12 of the first rectifier circuit 61 and the cathode of the fourth rectifier diode D14 of the first rectifier circuit 61 as shown in FIG. 6.

The second terminal of the first snubber inductor Lp11, the second terminal of the snubber capacitor Cp1 and the second terminal of the snubber resistor Rp1 are connected to the first terminal of the power switch disposed adjacent thereto. For example, the second terminal of the first snubber inductor Lp11, the second terminal of the snubber capacitor Cp1 and the second terminal of the snubber resistor Rp1 are connected to the anode of the diode Dw1 of the first power switch 41*a* or the anode of the diode Dw2 of the second power switch 42*a* as shown in FIG. 6.

Reference is made to FIG. 10C, which is a circuit diagram of the snubber circuit of a surge protecting circuit according to a sixteenth embodiment of the present disclosure.

As shown in FIG. 10C, the first terminal of the first snubber inductor Lp11 and the first terminal of the snubber capacitor Cp1 may be connected to a rectifier circuit. For example, the first terminal of the first snubber inductor Lp11 and the first terminal of the snubber capacitor Cp1 may be connected to the cathode of the second rectifier diode D12 of the first rectifier circuit 61 and the cathode of the fourth rectifier diode D14 of the first rectifier circuit 61 as shown in FIG. 6. The second terminal of the first snubber inductor Lp11 is connected to the first terminal of the snubber resistor Rp1.

The second terminal of the snubber resistor Rp1 and the second terminal of the snubber capacitor Cp1 are connected to the first terminal of the power switch disposed adjacent thereto. For example, the second terminal of the snubber resistor Rp1 and the second terminal of the snubber capacitor Cp1 are connected to the anode of the diode Dw1 of the first power switch 41*a* or the anode of the diode Dw2 of the second power switch 42*a* as shown in FIG. 6.

Figure 11D:
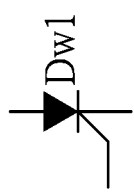
FIG. 11D is a circuit diagram of a power switch of a surge protecting circuit according to a twentieth embodiment of the present disclosure.
Figure 11C:
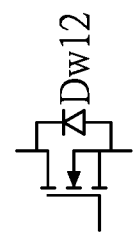
FIG. 11C is a circuit diagram of a power switch of a surge protecting circuit according to a nineteenth embodiment of the present disclosure.
Figure 11B:
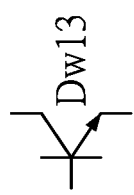
FIG. 11B is a circuit diagram of a power switch of a surge protecting circuit according to an eighteenth embodiment of the present disclosure.
Figure 11A:
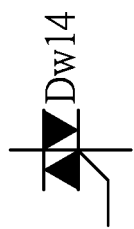
FIG. 11A is a circuit diagram of a power switch of a surge protecting circuit according to a seventeenth embodiment of the present disclosure.

Reference is made to FIG. 11A, which is a circuit diagram of a power switch of a surge protecting circuit according to a seventeenth embodiment of the present disclosure.

The first power switch 41*a* shown in FIG. 5 or FIG. 6 may be replaced with the power switch shown in FIG. 11A. That is, the power switch of the surge protecting circuit of the embodiment of the present disclosure may include the diode Dw1 but not the resistor Rh1.

The second terminal of the second capacitor Cr2 and the first terminal of the third resistor Rr3 of the surge detection driver circuit 20*a* as shown in FIG. 5 or FIG. 6 may be connected to the control terminal of the diode Dw1.

In practice, the second power switch 42*a* as shown in FIG. 5 or FIG. 6 or other power switches may be replaced with the power switch as shown in FIG. 11A.

Reference is made to FIG. 11B, which is a circuit diagram of a power switch of a surge protecting circuit according to an eighteenth embodiment of the present disclosure.

The first power switch 41a as shown in FIG. 5 or FIG. 6 or other power switches may be replaced with a field effect transistor Dw12 as shown in FIG. 11B, but the present disclosure is not limited thereto.

Reference is made to FIG. 11C, which is a circuit diagram of a power switch of a surge protecting circuit according to a nineteenth embodiment of the present disclosure.

The first power switch 41a shown in FIGS. 5 and 6 or other power switches may be replaced with a transistor Dw13 as shown in FIG. 11C, but the present disclosure is not limited thereto.

Reference is made to FIG. 11D, which is a circuit diagram of a power switch of a surge protecting circuit according to a twentieth embodiment of the present disclosure.

The first power switch 41a shown in FIGS. 5 and 6 or other power switches may be replaced with a triode AC switch Dw14 as shown in FIG. 11D, but the present disclosure is not limited thereto.

In conclusion, the present disclosure provides the surge protecting circuit. The surge protecting circuit of the present disclosure automatically detects the AC input signal supplied by the AC source. When the surge protecting circuit of the present disclosure determines that the AC input signal has the surge wave, the surge protecting circuit of the present disclosure instantly attenuates and filters the surge wave from the AC input signal. Therefore, electric appliances and electric wires can be effectively prevented from being damaged by the surge wave, thereby enhancing electrical safety of the electric appliances and electric wire.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A surge protection circuit, comprising:
 a first stage filter circuit connected to an alternating current (AC) source, and configured to filter an AC input signal provided by the AC source to output an initial filtered signal;
 a surge detection driver circuit connected to the first stage filter circuit, configured to detect the initial filtered signal, and configured to output a detection driving signal when the surge detection driver circuit determines that the initial filtered signal has a surge wave;
 a surge suppressor circuit, including:
  a plurality of snubber circuits, including:
   a first snubber circuit connected to the AC source, and configured to attenuate the AC input signal from the AC source to output a first snubber signal; and
   a second snubber circuit configured to attenuate a first filtered signal to output a second snubber signal; and
  a plurality of power switches, including:
   a first power switch, wherein a first terminal of the first power switch is connected to the first snubber circuit, a control terminal of the first power switch is connected to the surge detection driver circuit, and the first power switch operates to output a first surge suppressed signal according to the detection driving signal and the first snubber signal; and
   a second power switch, wherein a first terminal of the second power switch is connected to the second snubber circuit, a second terminal of the second power switch is connected to an output terminal of the surge protecting circuit, a control terminal of the second power switch is connected to the surge detection driver circuit, and the second power switch operates to output a second surge suppressed signal as an AC output signal of the surge protecting circuit according to the detection driving signal and the second snubber signal; and
 a multi-stage filter circuit connected to a second terminal of the first power switch and the second snubber circuit, and configured to filter the first surge suppressed signal from the second terminal of the first power switch to output the first filtered signal to the second snubber circuit.

2. The surge protecting circuit according to claim 1, wherein the first stage filter circuit includes a plurality of first filter capacitors connected to each other.

3. The surge protecting circuit according to claim 1, wherein the multi-stage filter circuit includes a plurality of first filter inductors and at least one filter capacitor, the plurality of first filter inductors are connected in series to each other, a first terminal of one of the plurality of first filter inductors is connected to the AC source, a second terminal of the one of the plurality of first filter inductors is connected to a first terminal of the first filter inductor disposed adjacent thereto, a first terminal of another of the plurality of first filter inductors is connected to a second terminal of the first filter inductor disposed adjacent thereto, a second terminal of the another of the plurality of first filter inductors is connected to a second terminal of each of the plurality of power switches, a first terminal of the at least one filter capacitor is connected to the second terminal of the first filter inductor disposed adjacent thereto, and a second terminal of the at least one filter capacitor is connected to an input terminal of one of the plurality of snubber circuits.

4. The surge protecting circuit according to claim 3, wherein the multi-stage filter circuit further includes a common mode choke, a first terminal of a first side of the common mode choke is connected to the second terminal of the another of the plurality of first filter inductors, a second terminal of the first side of the common mode choke is connected to an input terminal of the second snubber circuit, a first terminal of a second side of the common mode choke is connected to the second terminal of the at least one filter capacitor, and a second terminal of the second side of the common mode choke is connected to the input terminal of the second snubber circuit.

5. The surge protecting circuit according to claim 4, wherein the multi-stage filter circuit further includes an output filter capacitor, a first terminal of the output filter capacitor is connected to the second terminal of the first side of the common mode choke, and a second terminal of the output filter capacitor is connected to the second terminal of the second side of the common mode choke.

6. The surge protecting circuit according to claim 4, wherein the multi-stage filter circuit further includes a first output filter resistor and a second output filter resistor, a first terminal of the first output filter resistor is connected to the second terminal of the first side of the common mode choke, a second terminal of the first output filter resistor is connected to a first terminal of the second output filter resistor, and a second terminal of the second output filter resistor is connected to the second terminal of the second side of the common mode choke.

7. The surge protecting circuit according to claim 3, wherein the multi-stage filter circuit further includes a plurality of second filter inductors connected in series to each other, the second terminal of the at least one filter capacitor is connected to a second terminal of the second filter inductor disposed adjacent thereto, a first terminal of one of the plurality of second filter inductors is connected to the AC source, a second terminal of the one of the plurality of second filter inductors is connected to a first terminal of the second filter inductor disposed adjacent thereto, a first terminal of another of the plurality of second filter inductors is connected to the second terminal of the second filter inductor disposed adjacent thereto, and a second terminal of the another of the plurality of second filter inductors is connected to the input terminal of the one of the plurality of snubber circuits.

8. The surge protecting circuit according to claim 3, wherein the multi-stage filter circuit further includes an input filter capacitor connected in parallel to the at least one filter capacitor, a first terminal of the input filter capacitor is connected to the AC source and the first terminal of the one of the plurality of first filter inductors, and a second terminal of the input filter capacitor is connected to the input terminal of the one of the plurality of snubber circuits.

9. The surge protecting circuit according to claim 1, wherein each of the plurality of snubber circuits includes a snubber capacitor, a first snubber inductor and a snubber resistor, a first terminal of the snubber capacitor and a first terminal of the snubber resistor of the first snubber circuit are connected to the AC source, and a first terminal of the snubber capacitor and a first terminal of the snubber resistor of another of the plurality of snubber circuits are connected to the multi-stage filter circuit;
wherein, in each of the plurality of snubber circuits, a first terminal of the first snubber inductor is connected to a second terminal of the snubber capacitor, and a second terminal of the first snubber inductor is connected to the first terminal of the power switch disposed adjacent thereto.

10. The surge protecting circuit according to claim 9, wherein each of the plurality of snubber circuits further includes a second snubber inductor, a first terminal of the second snubber inductor of the first snubber circuit is connected to the AC source, a first terminal of the second snubber inductor of another of the plurality of snubber circuits is connected to the multi-stage filter circuit, and a second terminal of the second snubber inductor of each of the plurality of snubber circuits is connected to the first terminal of the snubber capacitor.

11. The surge protecting circuit according to claim 1, wherein each of the plurality of snubber circuits includes a snubber capacitor, a first snubber inductor and a snubber resistor, a first terminal of the snubber capacitor of the first snubber circuit is connected to the AC source, and a first terminal of the snubber capacitor of another of the plurality of snubber circuits is connected to the multi-stage filter circuit;
wherein, in each of the plurality of snubber circuits, a first terminal of the first snubber inductor is connected to a second terminal of the snubber capacitor, a second terminal of the first snubber inductor is connected to a first terminal of the snubber resistor, and a second terminal of the snubber resistor is connected to the first terminal of the power switch disposed adjacent thereto.

12. The surge protecting circuit according to claim 11, wherein each of the plurality of snubber circuits further includes a second snubber inductor, a first terminal of the second snubber inductor of the first snubber circuit is connected to the AC source, a first terminal of the second snubber inductor of another of the plurality of snubber circuits is connected to the multi-stage filter circuit, and a second terminal of the second snubber inductor of each of the plurality of snubber circuits is connected to the first terminal of the snubber capacitor.

13. The surge protecting circuit according to claim 1, wherein each of the plurality of snubber circuits includes a snubber capacitor, a first snubber inductor and a snubber resistor that are connected in parallel to each other, a first terminal of the snubber capacitor of the first snubber circuit is connected to the AC source, a first terminal of the snubber capacitor of another of the plurality of snubber circuits is connected to the multi-stage filter circuit, and a second terminal of the snubber capacitor of each of the plurality of snubber circuits is connected to the first terminal of the power switch disposed adjacent thereto.

14. The surge protecting circuit according to claim 13, wherein each of the plurality of snubber circuits further includes a second snubber inductor, a first terminal of the second snubber inductor of the first snubber circuit is connected to the AC source, a first terminal of the second snubber inductor of another of the plurality of snubber circuits is connected to the multi-stage filter circuit, and a second terminal of the second snubber inductor of each of the plurality of snubber circuits is connected to the first terminal of the snubber capacitor.

15. The surge protecting circuit according to claim 1, wherein each of the plurality of snubber circuits includes a snubber capacitor, a first snubber inductor and a snubber resistor, a first terminal of the snubber capacitor and a first terminal of the first snubber inductor of the first snubber circuit are connected to the AC source, and a first terminal of the snubber capacitor of another of the plurality of snubber circuits and a first terminal of the first snubber inductor are connected to the multi-stage filter circuit;
wherein, in each of the plurality of snubber circuits, a first terminal of the snubber resistor is connected to a second terminal of the first snubber inductor, and a second terminal of the snubber resistor and a second terminal of the snubber capacitor are connected to the first terminal of the power switch disposed adjacent thereto.

16. The surge protecting circuit according to claim 15, wherein each of the plurality of snubber circuits further includes a second snubber inductor, a first terminal of the second snubber inductor of the first snubber circuit is connected to the AC source, a first terminal of the second snubber inductor of another of the plurality of snubber circuits is connected to the multi-stage filter circuit, and a second terminal of the second snubber inductor of each of the plurality of snubber circuits is connected to the first terminal of the snubber capacitor.

17. The surge protecting circuit according to claim 1, wherein the surge detection driver circuit includes a first diode, a first capacitor, a first resistor and a first Zener diode, an anode of the first diode is connected to the first stage filter circuit, a cathode of the first diode is connected to a first terminal of the first capacitor, a second terminal of the first capacitor is connected to a first terminal of the first resistor and an anode of the first Zener diode, a second terminal of the first resistor is connected to the second terminal of each of the plurality of power switches, and a cathode of the first Zener diode is connected to the control terminal of each of the plurality of power switches.

18. The surge protecting circuit according to claim 1, wherein the surge detection driver circuit includes a first Zener diode, a first capacitor, a first resistor and a second Zener diode, an anode of the first Zener diode is connected to the first stage filter circuit, a cathode of the first Zener diode is connected to a first terminal of the first resistor, a first terminal of the first capacitor and an anode of the second Zener diode, a cathode of the second Zener diode is connected to the control terminal of each of the plurality of power switches, and a second terminal of the first resistor and a second terminal of the first capacitor are connected to the second terminal of each of the plurality of power switches.

19. A surge protection circuit, comprising:
a first stage filter circuit connected to an alternating current (AC) source, and configured to filter an AC input signal provided by the AC source to output an initial filtered signal;
a surge detection driver circuit connected to the first stage filter circuit, and configured to output a detection driving signal when the surge detection driver circuit detects has a surge wave;
a surge suppressor circuit, including:
a plurality of snubber circuits, including:
a first snubber circuit connected to the AC source, and configured to attenuate the AC input signal from the AC source to output a first snubber signal; and
a second snubber circuit configured to attenuate a first filtered signal to output a second snubber signal; and
a plurality of power switches, including:
a first power switch, wherein a first terminal of the first power switch is connected to the first snubber circuit, a control terminal of the first power switch is connected to the surge detection driver circuit, and the first power switch operates to output a first surge suppressed signal according to the detection driving signal and the first snubber signal; and
a second power switch, wherein a first terminal of the second power switch is connected to the second snubber circuit, a second terminal of the second power switch is connected to an output terminal of the surge protecting circuit, a control terminal of the second power switch is connected to the surge detection driver circuit, and the second power switch operates to output a second surge suppressed signal as an AC output signal of the surge protecting circuit according to the detection driving signal and the second snubber signal; and
a multi-stage filter circuit connected to a second terminal of the first power switch and the second snubber circuit, and configured to filter the first surge suppressed signal from the second terminal of the first power switch to output the first filtered signal to the second snubber circuit;
wherein the surge detection driver circuit is connected to the AC source, the surge detection driver circuit detects the AC input signal from the AC source, and the surge detection driver circuit outputs the detection driving signal to the control terminal of each of the plurality of power switches when the surge detection driver circuit determines that the AC input signal has the surge wave.

20. A surge protection circuit, comprising:
a first stage filter circuit connected to an alternating current (AC) source, and configured to filter an AC input signal provided by the AC source to output an initial filtered signal;
a surge detection driver circuit connected to the first stage filter circuit, configured to detect the initial filtered signal, and configured to output a detection driving signal when the surge detection driver circuit determines that the initial filtered signal has a surge wave;
a surge suppressor circuit, including:
a plurality of snubber circuits, including:
a first snubber circuit connected to the AC source, and configured to attenuate the AC input signal from the AC source to output a first snubber signal; and
a second snubber circuit configured to attenuate a first filtered signal to output a second snubber signal; and
a plurality of power switches, including:
a first power switch, wherein a first terminal of the first power switch is connected to the first snubber circuit, a control terminal of the first power switch is connected to the surge detection driver circuit, and the first power switch operates to output a first surge suppressed signal according to the detection driving signal and the first snubber signal; and
a second power switch, wherein a first terminal of the second power switch is connected to the second snubber circuit, a second terminal of the second power switch is connected to an output terminal of the surge protecting circuit, a control terminal of the second power switch is connected to the surge detection driver circuit, and the second power switch operates to output a second surge suppressed signal according to the detection driving signal and the second snubber signal; and
a multi-stage filter circuit connected to a second terminal of the first power switch and the second snubber circuit, and configured to filter the first surge suppressed signal from the second terminal of the first power switch to output the first filtered signal to the second snubber circuit;
wherein the multi-stage filter circuit is connected to the second terminal of the second power switch, and the multi-stage filter circuit is configured to filter the second surge suppressed signal to output a second filtered signal.

21. The surge protecting circuit according to claim 20, wherein the plurality of snubber circuits further includes a third snubber circuit, the plurality of power switches further includes a third power switch, the third snubber circuit is connected to the multi-stage filter circuit, a first terminal of the third power switch is connected to the third snubber circuit, a second terminal of the third power switch is connected to the output terminal of the surge protecting circuit, a control terminal of the third power switch is connected to the surge detection driver circuit, the third snubber circuit attenuates the second surge suppression signal to output a third snubber signal, and the third power switch operates to output a third surge suppressed signal according to the detection driving signal and the third snubber signal.

* * * * *